June 3, 1952   O. F. SPEVAK   2,598,851
TRACTION DEVICE
Filed July 30, 1947

INVENTOR
Otto F. Spevak
BY Albert S. McCabe
Attorney

Patented June 3, 1952

2,598,851

UNITED STATES PATENT OFFICE 2,598,851

TRACTION DEVICE

Otto F. Spevak, Berwyn, Ill.

Application July 30, 1947, Serial No. 764,732

2 Claims. (Cl. 301—43)

My invention relates to a traction device and more particularly to such a device which can in emergencies be quickly and easily mounted upon the driving wheels of an automobile, truck or the like.

An object of my invention is to provide an emergency traction device comprising a plurality of traction elements circumferentially distributed around the tread surface of a tire and which can be applied without necessitating the elevation of the wheel by jacks and the like.

Another object of the invention is to provide an emergency traction device suitable for the aforementioned purpose which will be comparatively simple in construction and at the same time desirably rigid, strong and durable.

Another object of my invention is to provide an emergency traction device which can be attached to a standard size wheel by utilizing the wheel bolts of said wheel.

The foregoing and other objects, features and advantages of my invention will appear from the following detailed description wherein reference is made to the accompanying sheet of drawings wherein.

Similar characters of reference refer to similar parts throughout the several views.

Figure 1:
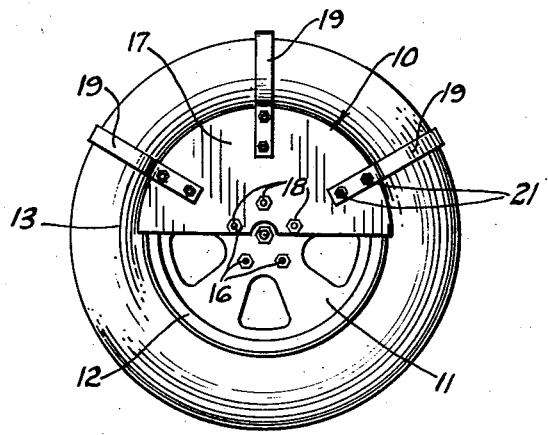
Fig. 1 is a side elevational view showing a preferred embodiment of my invention as it is applied to a conventional automobile wheel.

Referring more particularly to the exemplary embodiment of my invention disclosed in the accompanying drawings, I have shown my improved traction device 10 mounted on a conventional motor vehicle wheel 11, which wheel, in general, has a tire-engaging rim 12 adapted to carry a rubber tire 13 of the usual pneumatic type. On its periphery the tire has a tread surface 14. As is well known, such vehicle wheels, as presently made, are held in place relative to an axle 15 by wheel bolts 16.

Mounted on the face of the wheel 11 and secured in place by the wheel bolts 16, one form of my traction device is depicted in Fig. 1 as having a substantially semi-circular plate or disc segment 17 mounted against the exposed outer face of the wheel 11 and preferably engaging the rim 12. This disc segment is desirably of a smaller diameter than the tread surface of the tire and is secured in place by the wheel bolts 16 which extend through suitably disposed apertures in the segment. Nuts 18 are threaded onto the outer ends of the wheel bolts and are tightened against the outer surface of the disc segment.

Hook-like elements 19 are secured in substantially rigid relationship to the disc segment 17 and extend outwardly in radial directions and at circumferentially spaced positions from the arcuate portion of the disc segment. The hook-like elements 19 are curved to extend around the somewhat bulging side wall of the tire so as to overlie the tread surface of the tire. In addition to extending around the tire side wall, the curvature of the hook-like elements provides inherent resilience to permit their flexure upon engagement with, and departure from the road surface. It is also deemed preferable that the inner end portions 20 of the hook-like elements shall be extended inwardly in a radial direction, as shown in Figs. 2 and 3, to provide a stabilizing and gripping action adapted to maintain the proper position of the hook-like elements and prevent undue distortion thereof.

Figure 2:
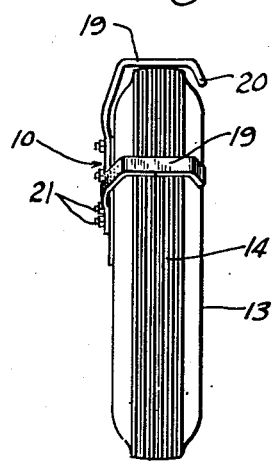
Fig. 2 is a front elevational view of the traction device shown in Fig. 1.

Although the hook-like elements 19 may be welded or otherwise permanently attached to disk segment 17, it is desirable, due to wear and possible breakage when worn, that the elements 19 be removably attached, as shown in Figs. 1 and 2, such removable attachment being accomplished by employing carriage bolts 21.

Figure 3:
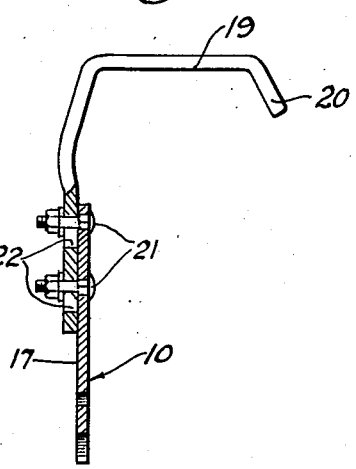
Fig. 3 is an enlarged side elevational view, partly in section, of a portion of the structure of the traction device shown in Figs. 1 and 2.

Fig. 3 shows an adjustable means of fastening the hook-like elements 19 to the disk segment 17. In some instances, particularly when one set of my traction devices must be adaptable to different sizes of tires, within reasonable limits, the hook-like elements 19 can be secured to the disk segment 17 for radial adjustment. As shown in Fig. 3, this adjustment is made possible by the longitudinally elongated apertures 22 in the hook-like elements 19.

Figure 4:
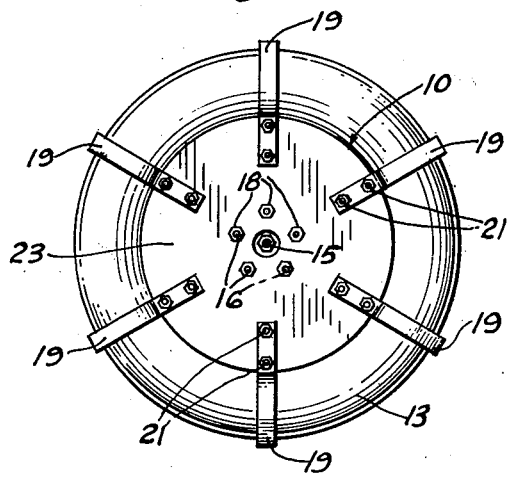
Fig. 4 is a side elevational view of a modification of my invention.

In Fig. 4, I have shown a modified form of my invention in which the plate 23 which carries the hook-like elements 19 is completely circular, rather than segmental as shown in Figs. 1, 2 and 3, and the hook-like elements are desirably disposed in symmetrical and circumferential displaced relationship around the periphery of the tire.

Figure 5:
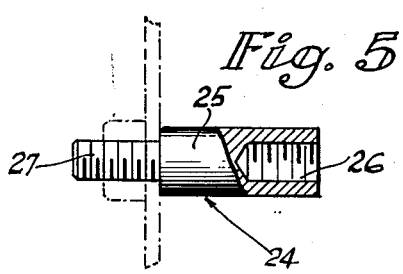
Fig. 5 is an enlarged view partly in section showing a bolt extension collar adapted, when necessary, to be used as an accessory to the mounting of my traction device.

In some instances it has been found necessary to extend the wheel bolts 16 in order that they may receive the disk or disk segment and the disk holding nuts. When such is the case, it is accomplished by an extension stud 24, such as that shown in Fig. 5, comprising a sleeve portion 25 having a threaded aperture 26 in one end thereof and an integral stud portion 27 extending from the other end thereof. The threaded aperture 26 in the sleeve may be threaded onto the wheel bolts 16, thereby allowing the stud portion 27, integral therewith, to extend through the disk or disk segment.

From the foregoing description and reference to the drawings it may be readily understood that either of the forms of my traction device provides a rugged and durable structure which may be easily attached to a vehicle wheel. Although unsymmetrical, if only one such device is used on a wheel at a time, the form shown in Fig. 1 is capable of attachment to the wheel without either raising the wheel off the ground or deflating the tire. When desired such devices may be used in pairs on each wheel to effect symmetry of disposition of the traction elements. Although having some advantage in strength, the traction device shown in Fig. 4, when the traction elements include the inwardly extending end portions 20, requires deflation of the tires for its application to the wheel. The adjustment of the extent of the traction elements which is provided by a structure such as that shown in Fig. 3 or its equivalent, suits the traction device to use with various sizes of tires, within limits, and, if desired, to a close fit on worn tires.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A traction unit manipulable as such into and out of cooperating relationship with a vehicle wheel of the bolted on type when the bolts whereby the wheel is secured to its associated axle are exposed and a pneumatic tire having a tread surface on its outer periphery mounted on said wheel and remaining normally inflated, said traction unit comprising a rigid hook carrier element, a hook element having a rigid shank portion rigidly secured to said carrier element and normally immovable relative thereto, said hook element also having a hook portion at the outer end of the shank portion and shaped to embrace the tire tread with an end projecting inwardly of the side of the tire on the side thereof opposite the shank portion, said traction unit being bodily movable as a rigid integer to cause the hook element to embrace the tire and extend across its tread portion alongside its two side walls while said carrier element is being brought into contiguity with the wheel and within the tire carrying portion thereof, said carrier element being engageable with the wheel at a plurality of spaced-apart points and provided at at least one of said points of engagement with an aperture for cooperation with one of the bolts whereby the wheel is secured in appropriate relationship to its associated axle.

2. A traction unit manipulable as such into and out of temporary cooperating relationship with a vehicle wheel of the bolted on type when the bolts whereby the wheel is secured to its associated axle are exposed and a pneumatic tire having a tread surface on its outer periphery mounted on said wheel and remaining normally inflated, said traction unit comprising a rigid hook carrier element, a plurality of hook elements each having a rigid shank portion rigidly secured to said carrier element and normally immovable relative thereto, said hook elements being located at arcuately spaced positions relative to the carrier element and extending away from said carrier element, said hook elements also having hook portions at the outer ends of the shank portions and shaped to embrace the tire tread with an end projecting inwardly of the side of the tire on the side thereof opposite the shank portions, said hook elements radiating from the carrier element within an overall angle of more than 90° and less than 180° so that said traction unit is bodily movable as a rigid integer to its position embracing the tire with the hook elements extending across the tread surface while said carrier element is being brought into contiguity with the wheel and within the tire carrying portion thereof, said carrier element being engageable with the wheel at a plurality of spaced-apart points and provided at at least one of said points of engagement with an aperture for cooperation with one of the bolts whereby the wheel is secured in appropriate relationship to its associated axle.

OTTO F. SPEVAK.

REFERENCES CITED

The following references are of record in the file of this patent:

UNITED STATES PATENTS

| Number | Name | Date |
| --- | --- | --- |
| 1,177,928 | Marsch | Oct. 7, 1930 |
| 2,207,825 | Schmeiser | July 16, 1940 |
| 2,452,688 | Schlett | Nov. 2, 1948 |
| 2,463,605 | Devine | Mar. 8, 1949 |

FOREIGN PATENTS

| Number | Country | Date |
| --- | --- | --- |
| 367,057 | Italy | Jan. 14, 1939 |
| 693,003 | Germany | June 29, 1940 |
| 813,291 | France | May 29, 1937 |